April 28, 1953
T. W. ZOBEL
2,636,415
INTERFEROMETER AND SCHLIEREN APPARATUS
WITH UNUSUALLY LARGE MEASURING FIELD
Filed Nov. 14, 1950
8 Sheets-Sheet 1
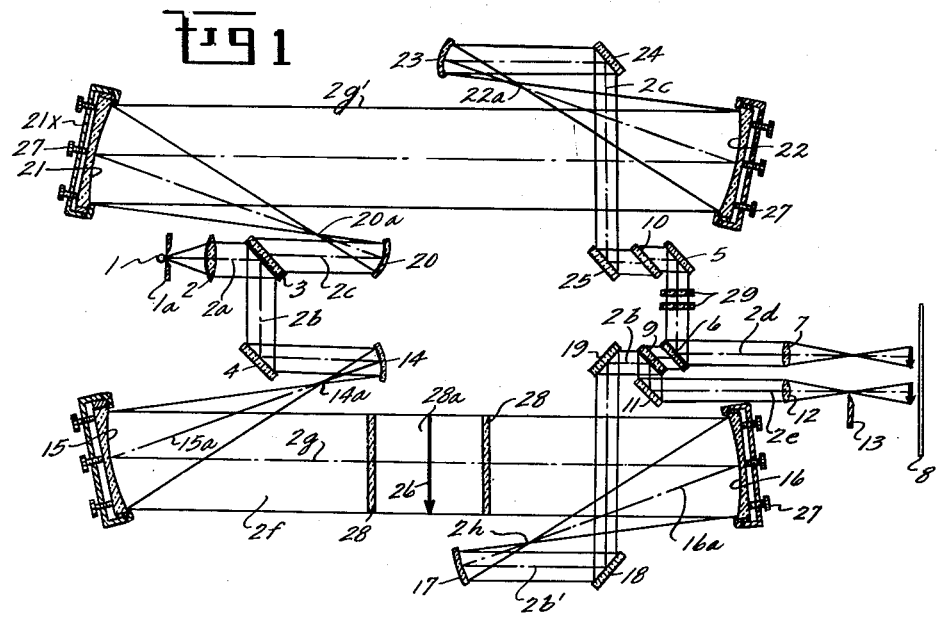
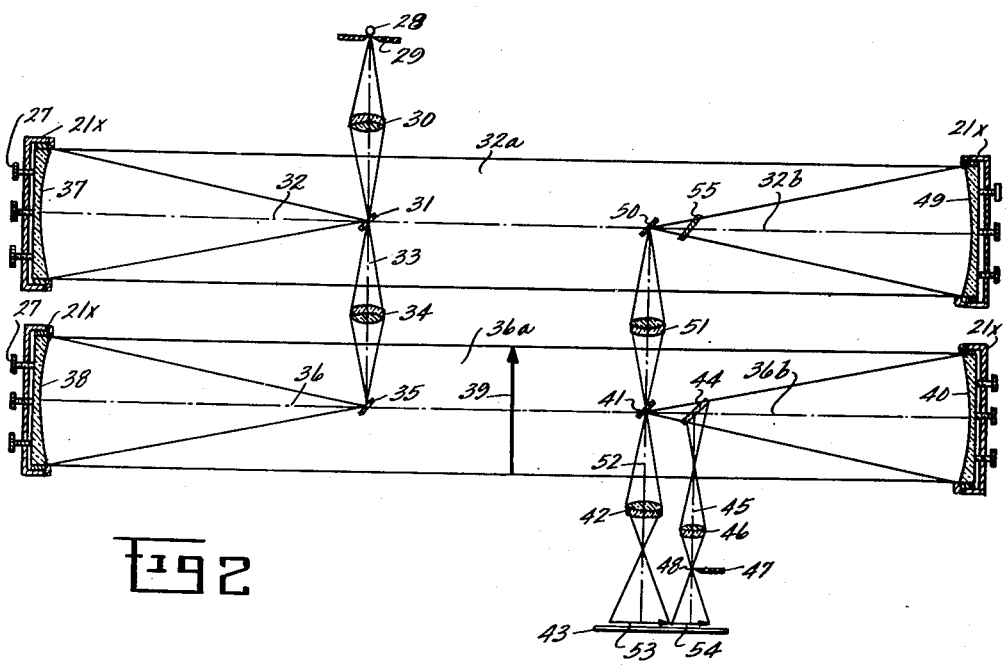
INVENTOR.
THEODOR W. ZOBEL
BY
*Wade Koontz*
*Charles H. Wagner*
ATTORNEYS

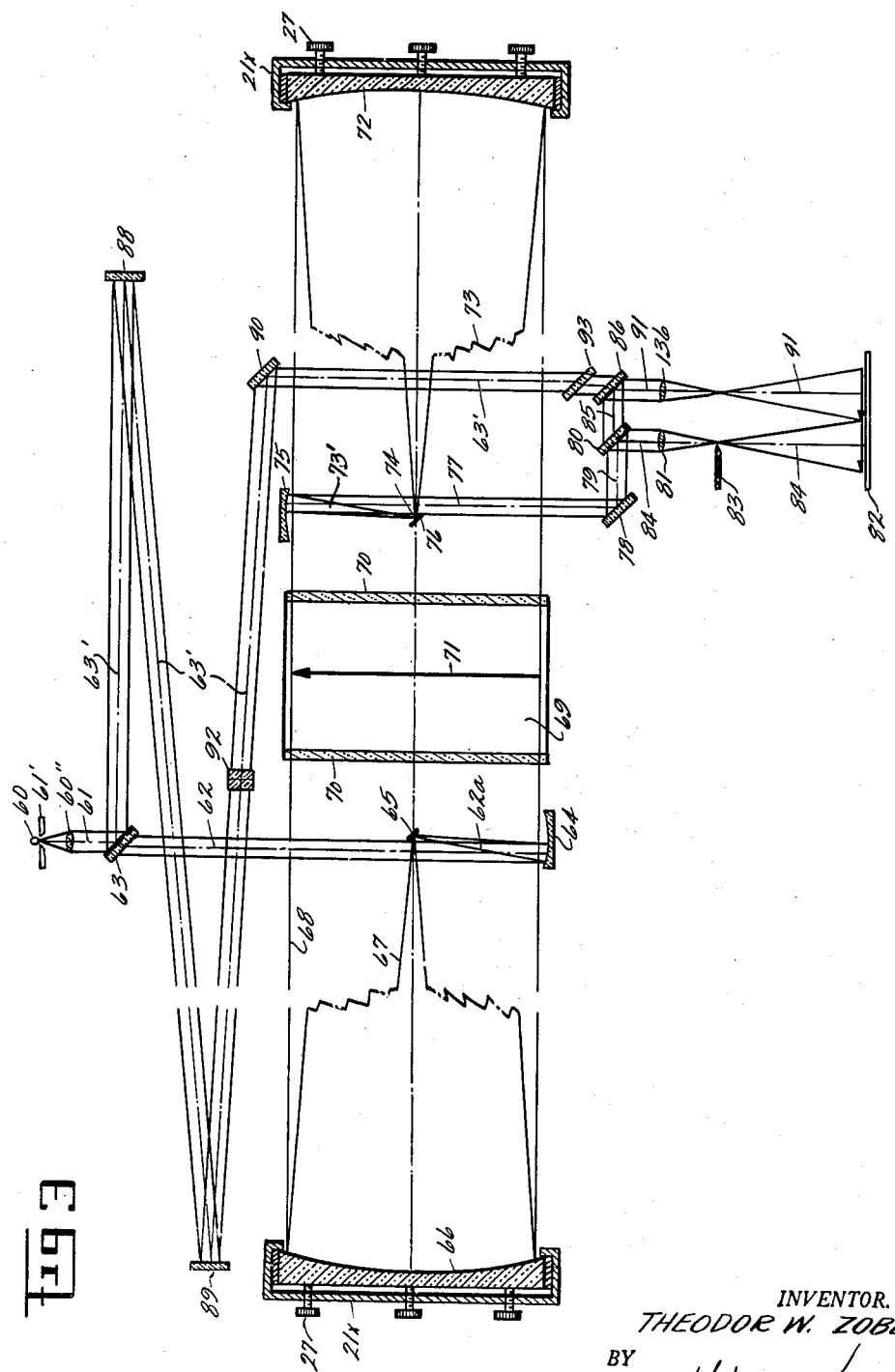

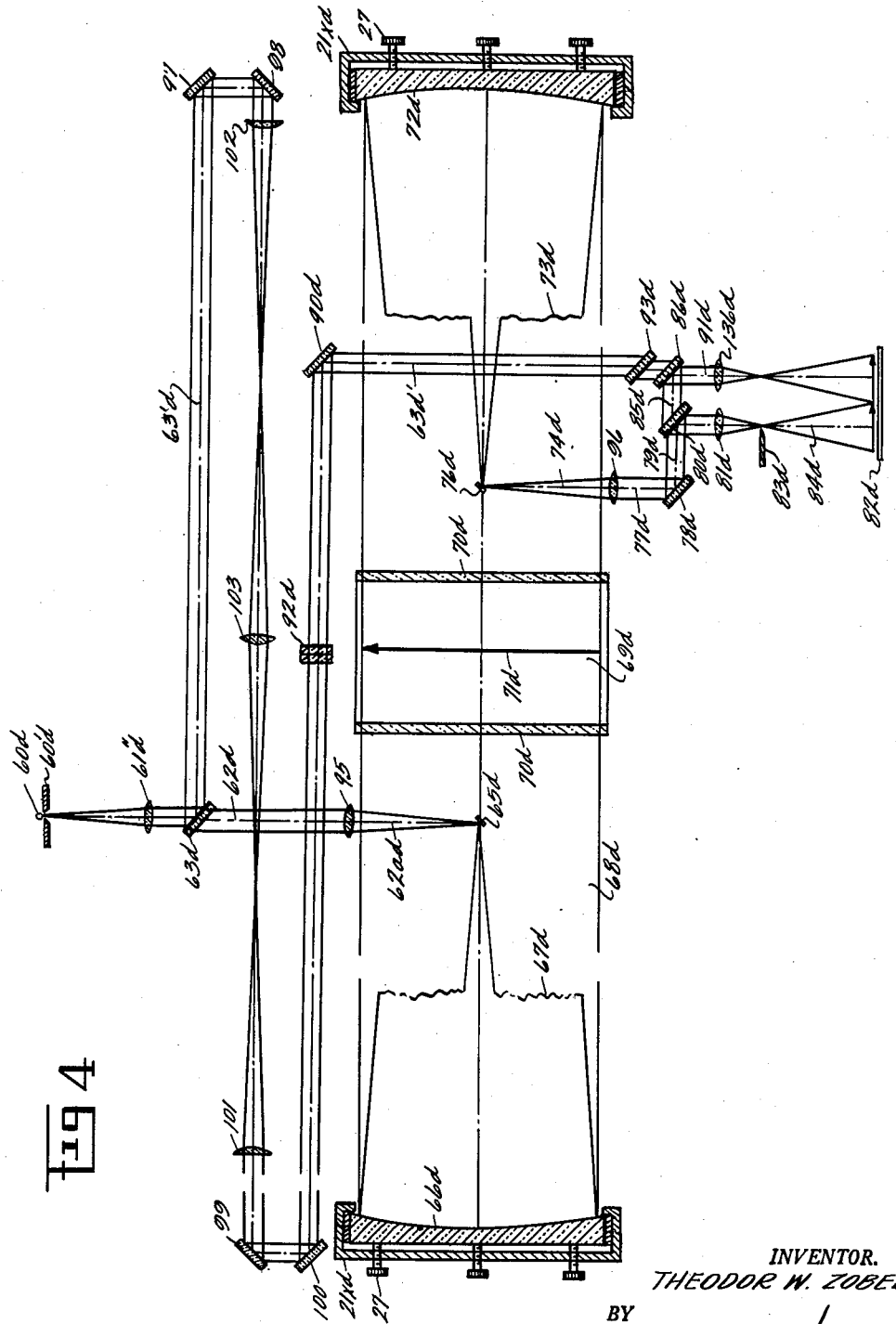

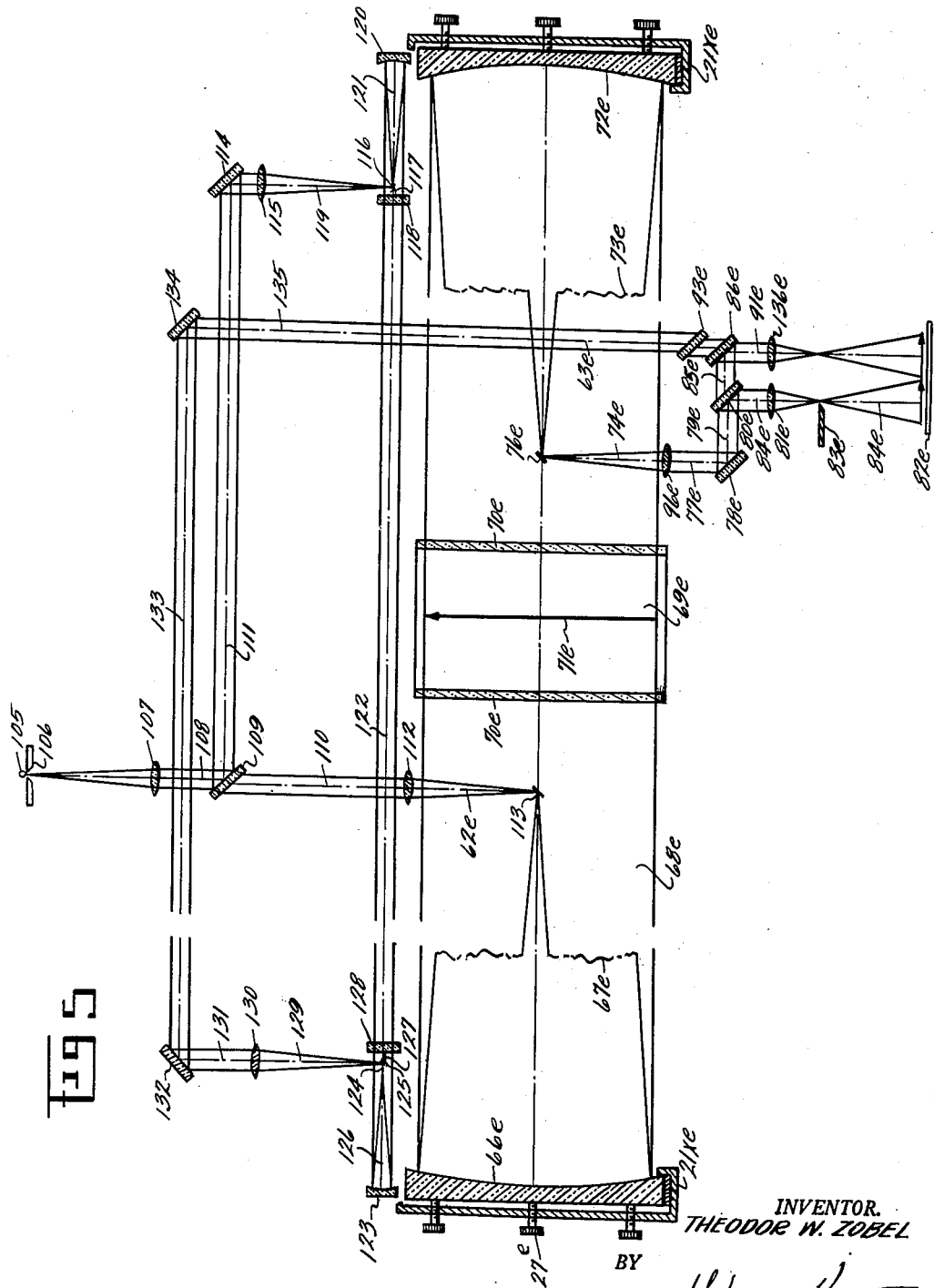

April 28, 1953
T. W. ZOBEL
2,636,415
INTERFEROMETER AND SCHLIEREN APPARATUS
WITH UNUSUALLY LARGE MEASURING FIELD
Filed Nov. 14, 1950
8 Sheets-Sheet 5
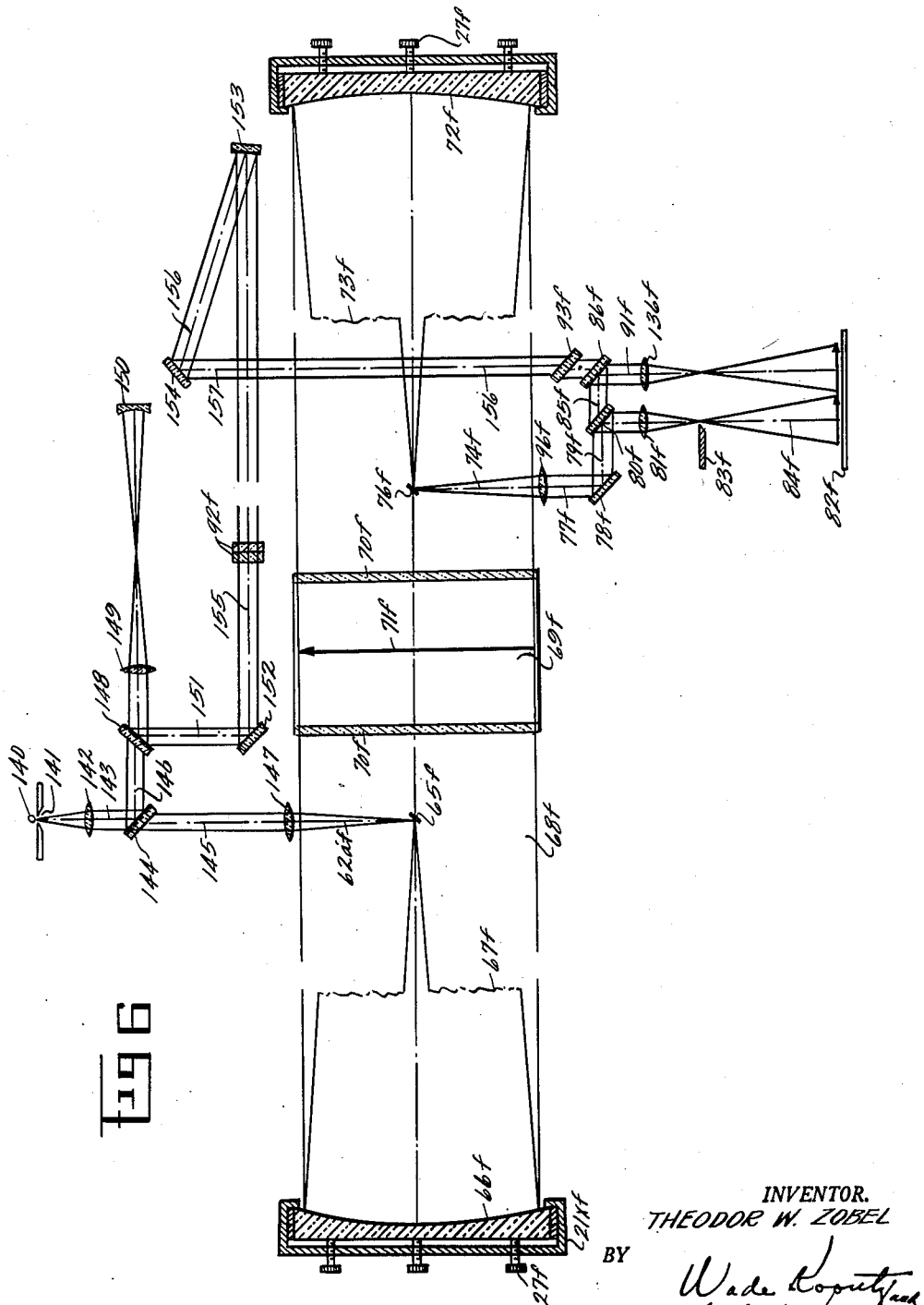
INVENTOR.
THEODOR W. ZOBEL
BY
ATTORNEYS

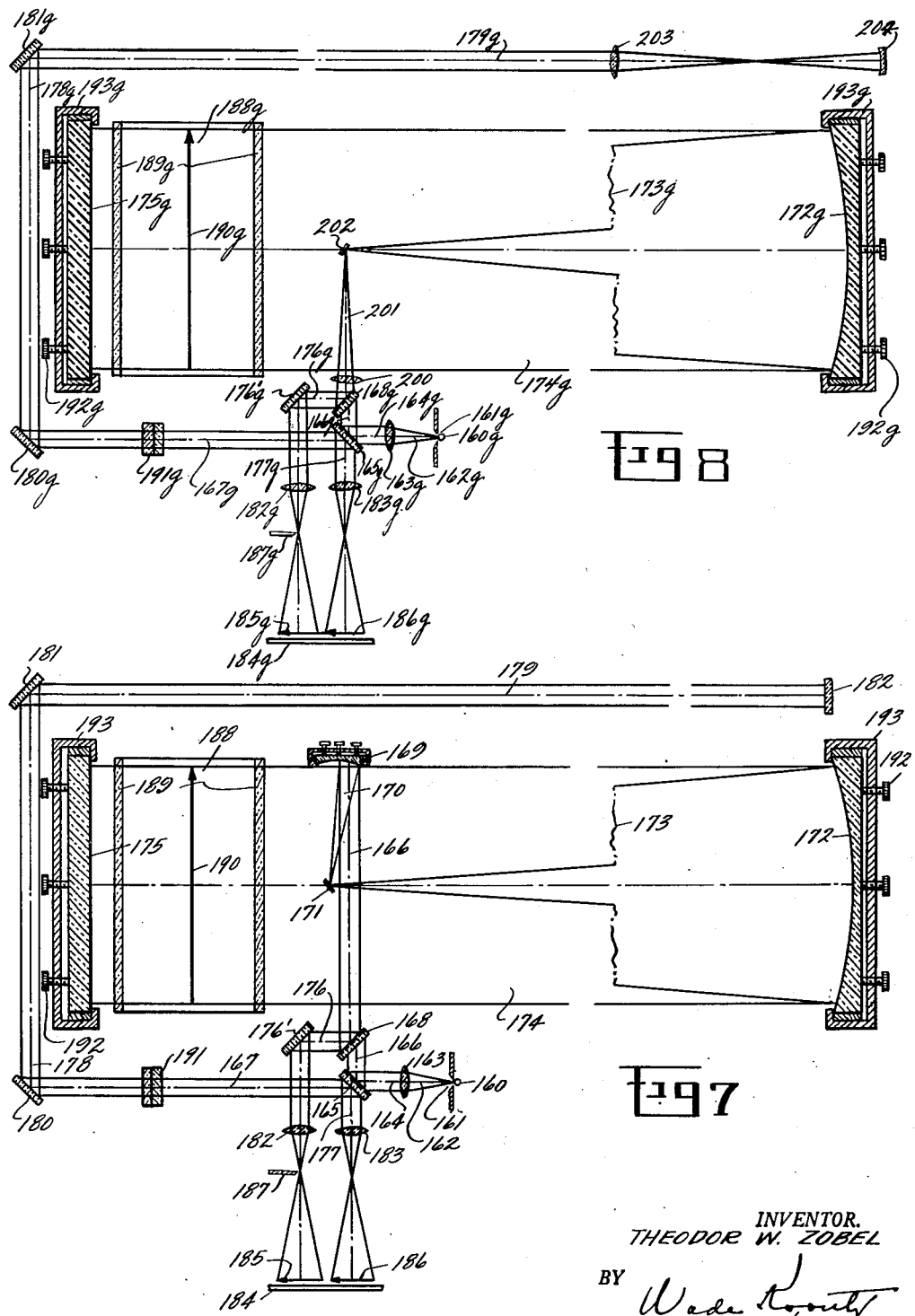

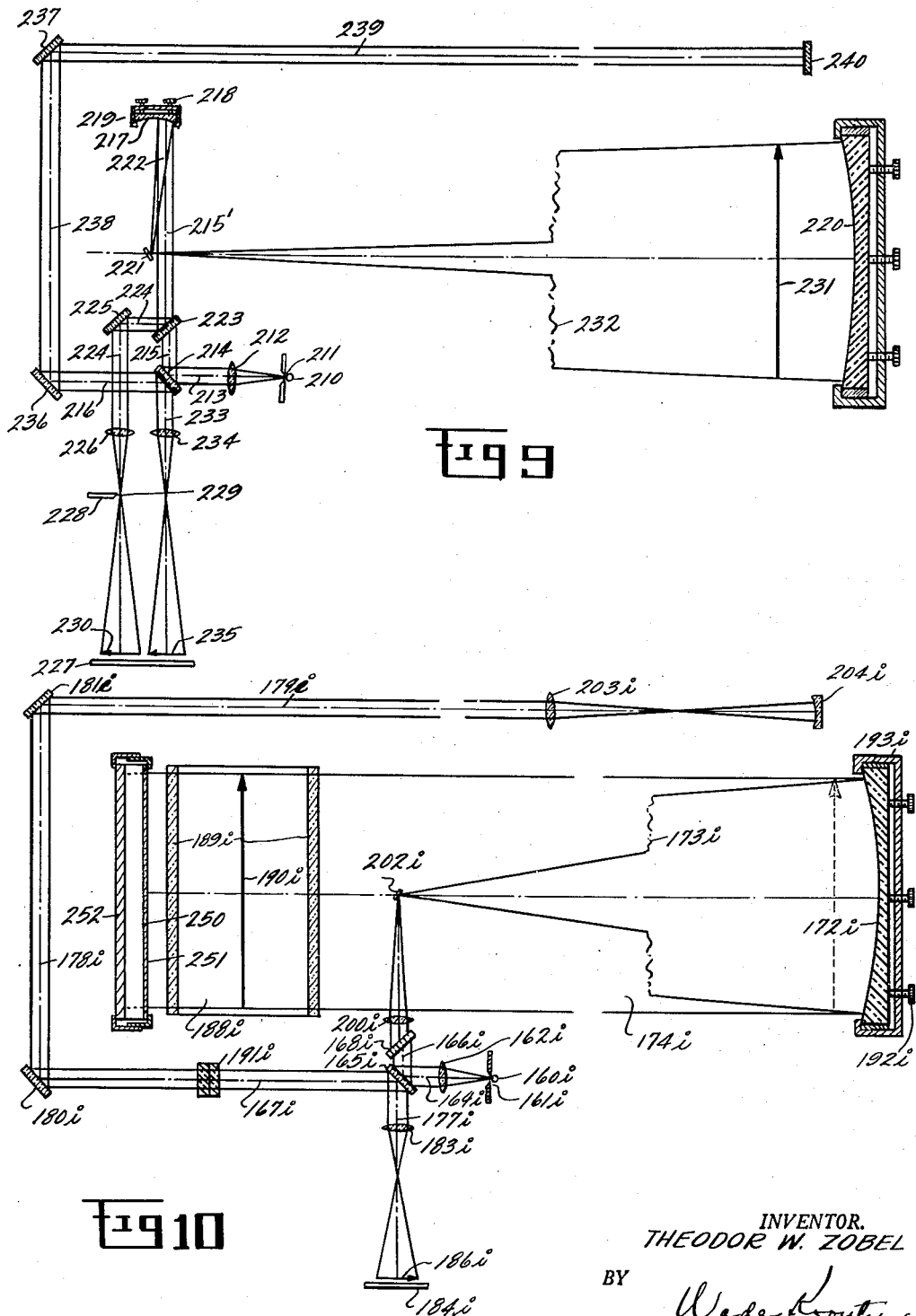

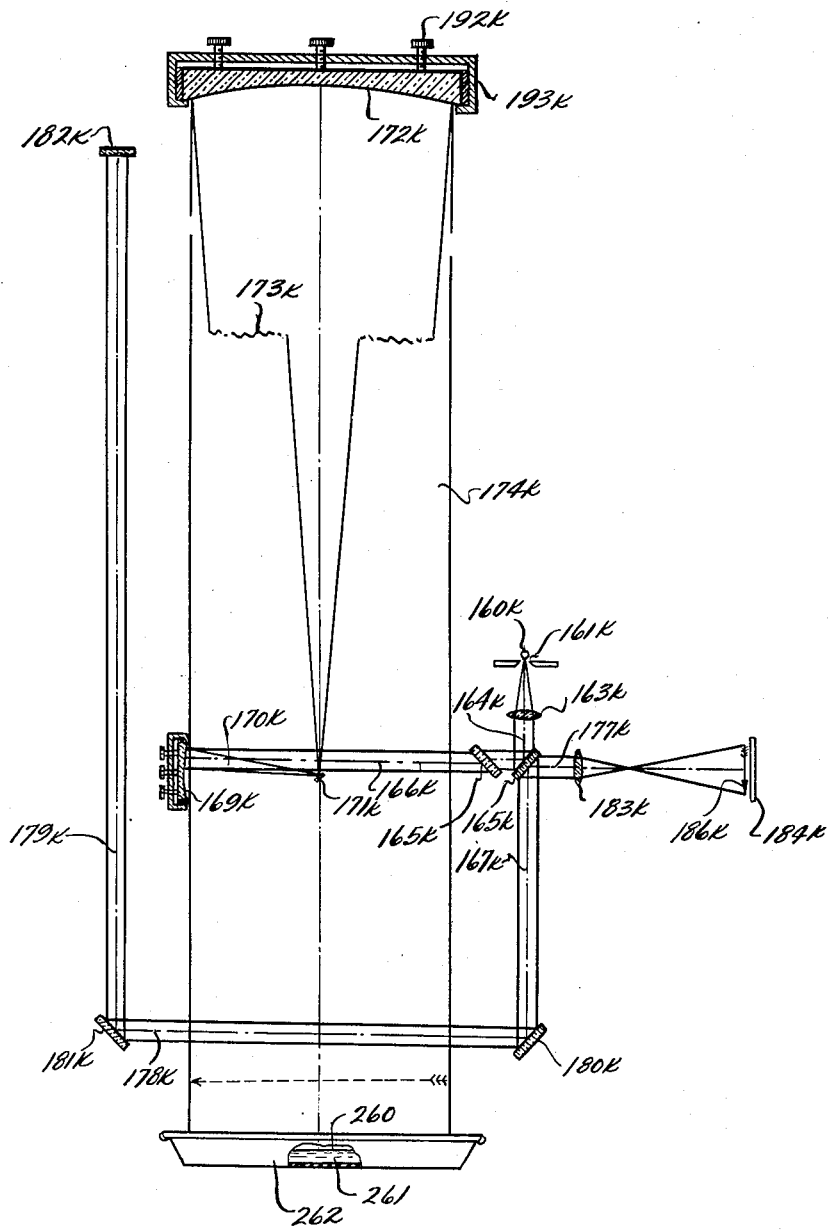

UNITED STATES PATENT OFFICE 2,636,415

INTERFEROMETER AND SCHLIEREN APPARATUS WITH UNUSUALLY LARGE MEASURING FIELD

Theodor W. Zobel, Braunschweig, Germany

Application November 14, 1950, Serial No. 195,687
In Germany July 24, 1950

15 Claims. (Cl. 88—14)

(Granted under Title 35, U. S. Code (1952), sec. 266)

The invention described herein may be manufactured and used by or for the Government for governmental purposes without payment to me of any royalty thereon.

This invention relates to interferometers and Schlieren apparatus and has for an object the provision of an optical system in which the comparative and test beams are of a relatively small area, and includes means for increasing area of the test beam before it traverses the test medium and reducing the area after it has traversed the test medium to substantially its former area.

The only optical method which seems to be promising to deliver direct quantitative data is the interference method, or the combined interference Schlieren method. It is desirable to utilize large measuring fields for instance 40 or more inches in diameter and even larger if they could be obtained.

Unusually large measuring fields, for instance, 40 inches in diameter and larger are utilized up to now only with instruments for the Schlieren- and shadowgraph method because large diameter optical elements like concave mirrors, can be manufactured and surfaced with sufficient accuracy. But very difficult and strange problems arise when complete conventional interference devices with unusually large measuring fields are employed; and high quality flat surfaces are needed.

There are three main groups of problems existing:

(1) *The glass problem.*—Glass plates suitable for the beam splitter plates in interferometers and even for wind tunnel windows must be of such fine quality that the uniformity within the glass is smaller than $\pm 5 \cdot 10^{-7}$ of the index of refraction of the glass for thicknesses between 3 and 4 inches. (See Research Paper RP1969, vol. 42, March 1949, part of the Journal of Research of the National Bureau of Standards entitled "Optical Glass of Interference and Schlieren Quality for Wind Tunnel Optics," by Leroy W. Tilton.

It seems that at the present time there are only a few sources existing in the world where the tradition, technique and experiences are available for making glass plates of unusually large dimensions with the desired optical quality for interference purposes. Those plates are, of course, extremely expensive.

The next problem is:

(2) *The surface accuracy.*—Since the allowable inaccuracy of a reflecting or light transmitting surface is determined by the minimum number of ring shaped interference fringes which should be constant independently of the size of the plate, the necessary accuracy of the surface increases with the square of the enlargement of the plate. That means, for instance, that if a plate of interference quality should be enlarged to four times the diameter of a comparison plate its accuracy must then be 16 times higher if the same interference figure should appear finally in the large plate. If possible at all, it is extremely difficult and very costly to obtain such a plate.

Furthermore, after studies of the inventor on the subject it was found that up to the present time the problem of flexibility of large glass plates with ratios of diameter to thickness from 5 and larger is neither dominated with regard to the surfacing process nor to the measuring process.

It seems to be doubtful whether it will be possible or practicable to build conventional interferometers with unusually large measuring fields in the present or conventional way even if satisfactorily optically good glass is available. (See "Optical Corrections for Interference Measurements by a Controllable Deformation of Reflecting Surfaces" by Theodor W. Zobel, Air Force Technical Report 5664.)

Another group of problems is connected with the:

(3) *Surface measurements.*—Extended tests led to the conclusions that exact surface measurements on unusually large plates must fail for several reasons when using conventional methods. The method of using a comparison plate of interference quality could only be successful if a "weightless" comparison plate would exist having a size at least as large as that of the plate to be tested and the flexibility of such a plate makes it impossible to realize a good comparison plate of such quality. Consequently it must be assumed that there is very little likelihood at the present time that conventional interferometers of any type with unusually large measuring fields can be built in the common way because of the above difficulties.

It should be noted that to build a large interferometer of the Mach-Zehnder type for wind tunnel purposes would need at least 15 very large optical parts of the highest quality including high quality windows for the test section or chamber or the pressure cabin around it as well as for the compensator plates in the comparison beam. The basic optical system along (without the wind tunnel windows) needs eleven very large parts, of which eight must have substantially perfect optical quality. According to the paper previously mentioned by L. W. Tilton the windows should be equal in thickness within $\pm \frac{1}{16}\lambda$ if high quality interference measurements are to be obtained.

Even if it would be possible technically to produce such an interferometer instrument the expense would be extremely great, since the price at the present time for only one glass plate, 50 inches in diameter, 4 inches thick, might be as much as about $100,000.00 without the final surfacing process and such a complete instrument could easily be a million dollar project.

The present invention is a modified type of an interferometer in which the number of very large optical parts of high quality can be reduced to a minimum of only two, and whereby these two large parts may be concave or parabolic mirrors which must only provide high quality reflecting surface conditions. These concave mirrors can be made thick enough to resist the influence of the flexibility within reasonable prescribed allowable limits, and existing methods for surface tests are sufficiently satisfactory to obtain the necessary optical quality of the reflecting surfaces. All other optical components needed for my improved interference device may be very much smaller i. e., for instance, $\frac{1}{10}$ or smaller of the diameter of the two big ones. The interference quality on small surfaces which have only about $\frac{1}{100}$ of the area or less than the large ones can be obtained without any special difficulties. Also the small beam splitter plates required can be made accurately enough in the conventional way.

In any basic interference system interference fringe patterns can also be produced if an additional optical component, for instance, a lens or something like that is inserted into one light beam and is compensated for correspondingly within the other beam. A transformation of wave fronts within one beam does not disturb the production of interference phenomena if the transformation also occurs "optically in the same way within the other beam." This condition, however, can be fulfilled geometrically in a symmetrical manner as well as in an unsymmetrical manner. For instance, in accordance with the invention, an enlargement of the measuring or testing field up to unusually large dimensions and the reduction of the field again, within a 4-plate system of the Mach-Zehnder type of interferometer can be made artificially in order to produce a large measuring light beam transversing the medium to be tested. In many cases of aerodynamic measuring technique those large measuring fields are very important for the proper evaluation of the test results.

The quality of the interference fringe system of the given basic system remains the same if the transformation of the wave fronts within this system are equally made in both light beams. But since in all cases the parts used for the basic system cannot be absolutely correct but only approximated the addition of the big parts of the optical system will lessen the quality of the final interference pattern to a certain degree.

The next consequent step in the application of the idea of invention is to obtain optical balance by geometrical unsymmetry of the system. This can be done by enlarging the measuring beam only and by compensating its optical length within the comparison beam, or by using the same kind of transformation within the comparison beam but by using no enlargement or a slight one of this beam.

Even the construction of such an interferometer with an unusually large measuring field to provide a combined interference-Schlieren apparatus does not need additional large optical components, while the common conventional Mach-Zehnder type would normally need four additional big parts to include the Schlieren apparatus therein.

Of course it must be remembered that in spite of the evidence of the advantages of the invention, that it is very difficult and time consuming to make even the two very large concave mirrors with the high interference quality required for the apparatus, and a method proposed and used by the inventor is to make slight deformations of reflecting surfaces after they have been finished to as high quality as possible in order to get the very best optical corrections. This is also useful in obtaining substantially optically perfect concave reflector of exceptionally large size.

An object of the invention therefore is to utilize a conventional type of interference or Schlieren apparatus and enlarge the test beam, or a portion of the test beam, which traverses the test medium and then reduce the area of the beam again so that with the exception of the portion of the beam which traverses the test medium, small official parts, having areas considerably less than the area of the test medium traversed may be employed.

A further object is the provision of an interferometer apparatus of the Mach-Zehnder type, in which a portion of the test beam which traverses the test medium is enlarged whereby it is capable of traversing a larger test medium and is again reduced, together with similar beam enlarging and reducing means in the comparison whereby the comparison beam is similarly enlarged and then reduced.

A further object is the provision of a combined interference and Schlieren apparatus in which the test or measuring beam is split to obtain the Schlieren beam and the test beam is enlarged and reduced respectively before and after it traverses the test medium and before it is split to form the Schlieren beam, whereby smaller optical beam splitting and reflecting means may be employed for the interferometer apparatus, utilizing an enlarged test beam for traversing a test medium having a greater diameter than the beam splitting and reflecting means.

A further object is the provision of an interferometer apparatus for producing an interference beam composed of a test beam arranged to traverse a test medium and a comparison beam, in which the maximum diameter of the test beam where it traverses the test medium is larger than the diameter of the interference beam.

Other objects and advantages will become apparent from the following description and the accompanying drawings in which like reference characters refer to like parts in the several figures of the drawings:

Fig. 1 is a sectional view, diagrammatically illustrating a basic Mach-Zehnder interferometer arrangement for obtaining interference and Schlieren images, incorporating my invention therein, in which the light inlet and exit paths are transformed by concave mirrors for including means causing a comparative enlargement of both the test and the comparison beams. Hereby the concave mirrors can be used either as out of center parabolic mirrors which means an optically symmetrical system or as normal shaped mirrors used in an oblique light beam and therefore optically unsymmetrical.

Fig. 2 is a diagrammatic sectional view of a slightly modified form of a symmetrical type of combined interference and Schlieren interferometer apparatus in which both test and comparison beams are similarly enlarged and then reduced in diameter at similarly disposed points respective intermediate their lengths;

Fig. 3 is a further modified arrangement having a symmetrical light intake and exit arrangement in which the test or measuring beam only is enlarged and the comparison beam is equal in length relative to the test beam but is not enlarged. In this form only two optical reflecting elements of large size are required.

Fig. 4 is a somewhat diagrammatic view of a slightly modified construction, somewhat similar to that shown in Fig. 3, but employing small lenses in the comparison beam and in the test beam for correspondingly projecting the beams through focal points of the large mirrors instead of utilizing the small concave reflectors as shown in Fig. 3 for this purpose;

Fig. 5 is a further slightly modified arrangement in which a combination of concave reflectors and lenses are symmetrically arranged in the comparison and test beams, and the concave reflectors in the test beam are larger than those in the comparison beam so as to enlarge the test beam where it traverses the test medium;

Fig. 6 is a further modified arrangement somewhat similar to Figs. 4 and 5, a concave spherical mirror and beam splitter plate being utilized in the comparison beam in order to realize similar optical conditions in the comparison beam like in the measuring beam.

Figs. 7 and 8 are further modification arrangements for producing the reflected path of the comparison beam;

Fig. 9 is a still further modification utilizing a single large concave or spherical reflector, together with a small concave reflector for enlarging the measuring beam before it traverses the test medium and correspondingly reducing the measuring beam in itself to its former diameter after it has traversed the test medium;

Fig. 10 is a further modification, utilizing a single large concave reflection and a single large reflector plate in combination with a common symmetrical light inlet and outlet optical arrangement; and Fig. 11 illustrates an arrangement for enlarging the test beam, having a large parabolic concave mirror for producing the enlarged collimated test beam, and including a liquid reflecting medium such as water or any other liquid interposed in the path of the enlarged beam, whereby the test or measuring beam is reflected back to the large parabolic mirror, this large mirror and part of the smaller optical elements which are utilized for light inlet are utilized the second time for the light outlet arrangement.

Referring to Fig. 1 the reference numeral 1 denotes a light source, preferably of monochromatic light, having a light aperture 1a. An achromatic lens element 2 is positioned in front of the light aperture 1a, collecting the light passing through the aperture and collimating the same to form the collimated light beam 2a. A partially transparent flat reflector plate or mirror 3 is inclined across the collimated beam 2a and constitutes a beam splitter plate for splitting the collimated beam 2a into two partial beams of collimated light, a test beam 2b which is reflected by the partially transparent reflecting surface of the plate 3, and a comparison beam 2c which passes through the plate, as shown in the drawing. The elements just described form the "light entrance" portion and first half of a conventional 4-plate interferometer arrangement such as the Mach-Zehnder type interference apparatus. The test beam 2b would ordinarily (in the conventional four-plate apparatus) be reflected by a full mirror 4 in parallel relation to the comparison beam 2c, the measuring or test beam 2b traversing the test medium while the comparison beam 2c would by-pass the test medium. A flat full mirror 5 is ordinarily inclined across the comparison beam 2c to reflect the same across the test beam 2b, and a second partially transparent beam splitter plate 6 is interposed at the point of intersection of the two beams for the purpose of recombining them to form the interference beam 2d. The test beam 2b passes through the beam splitter plate 6 while the comparison beam 2c is reflected by the plate 6 in the same direction, forming the interference beam 2d.

The interference beam 2d passes through a lens 7 which produces a picture of the medium to be tested and simultaneously produces an interference image on the screen 8.

When a Schlieren image is desired, a second partially transparent splitter plate 9 is inclined across the test beam 2b before it strikes the partially transparent plate 6, splitting the test or measuring beam to produce a second partial light beam 2e after the test beam 2b traverses the test medium. This beam 2e is the Schlieren beam and is preferably reflected in parallel side-by-side relation to the interference beam 2d by a flat or plane full mirror 11. A transparent compensator plate 10 is placed in the comparison beam 2c to compensate for the change in wave length of the light in the measuring beam 2b while passing through the beam splitter plate 9. The partially reflected portion 2e of the test beam 2b is then passed through a lens element 12, similar to the lens element 7, and is projected onto the viewing screen 8 in the same manner as the interference beam 2d. At the first focal length distance from the lens 12 a Schlieren knife edge element 13 is disposed to engage the side of the Schlieren beam 2e, producing a Schlieren image of the test medium on the screen 8 which is the same size as the interference image of the test medium when projected onto the screen 8.

The optical elements just described complete the structural or optical arrangement of a four-plate interferometer of the Mach-Zehnder type, and one which includes means for simultaneously producing a Schlieren image.

Due to the high optical precision necessary for producing interference pictures of large size test models, and the expense incurred in connection with interferometers having relatively very large covering power for this purpose, as set forth in the opening statement of the invention, the flat reflector plates 4, 5 and 11, and the beam splitter plates 3, 6 and 9 must be of the highest optical quality and optically flat in order to produce satisfactory interference phenomena, also the compensator plate 10 which compensates the beam splitter plate 9, and the two compensator plates 29, 29 which compensate for the windows 28, 28 in the test chamber must be of the same excellent optical quality as the test chamber windows 28.

In order to examine a large test medium, much greater in size or area than the initial collimated beam 2a, or the final interference beam 2d, or the Schlieren beam 2e, I proposed to enlarge either the test beam 2b throughout the portion of its length between the flat mirror 4 and the beam splitter plate 6 (or the beam splitter plate 9 when the Schlieren image producing optics are included), without enlarging the comparison beam or, as shown in Fig. 1, or I proposed to similarly or symmetrically enlarge both a portion of the test 2b and a similar portion of the comparison 2c beam so that the optical arrangement and "manipulation" of the two partial beams will be identical, or to enlarge the comparison beam 2b to any desired amount between. In carrying out this latter arrangement a small concave parabolic reflector 14 is disposed in the collimated test beam 2b, following the reflection thereof by the full plane mirror 4. The concave reflector 14 can be positioned slightly "off axis" or out of center and optically symmetrical to the beam 2b. The beam 2b is converged through the focal point 14a onto the reflecting surface of the large concave parabolic mirror 15 having its focal point also substantially coincident with the focal point 14a but slightly off axis relative to the axis of the mirror 14.

The large front surface concave mirror 15 produces a large collimated beam 2f, forming a greatly enlarged portion of the original test beam 2b. A second large concave parabolic mirror 16, similar to the mirror 15 can be slightly inclined across the enlarged test beam 2f or used as an out of center parabolic after the same has traversed a test medium 26 located between the large windows or plates 28 at opposite sides of the test chamber 28a. The slightly off axis relation of the optical axis 16a of the second large concave reflector 16 is preferably identical to the angular relation between the axis 2g of the enlarged test beam 2f and the optical axis 15a of the measuring beam enlarging concave mirror 15. Also the curvature of the reflecting surfaces of the two large mirrors 15 and 16 are preferably identical. The second large concave parabolic reflector 16 constitutes a test beam reducing means which converges the enlarged test beam 2f substantially through the focal point of the mirror 16 and onto a small concave slightly "off axis" parabolic reflector 17 having a substantially coincident but slightly off axis focal point relation (similar to the other small concave mirror 14). The small mirror 17 reflects the reduced test beam 2b' parallel to the enlarged portion 2f, and also parallel to the original collimated test beam 2b before it was enlarged and then reduced respectively by the mirrors 14, 15, 16 and 17. This reduced portion of the beam 2b is reflected back on the axis of the original beam 2b by two small full mirrors 18 and 19 disposed with their reflecting surfaces parallel to each other. The test beam has thus traversed a test medium of large size and now passes through the beam splitter plate 9, splitting the beam to provide the Schlieren beam 2e, producing a Schlieren image of test medium on the image receiving screen 8. The remaining portion of the test beam 2b passes through the "recombining" beam splitter plate 6, recombining at this point with the comparison beam 2c to form the interference beam 2d which is projected onto the screen 8 to form an interference beam 2d which is projected onto the screen 8 to form an interference image and a picture of the large test medium on the screen 8 adjacent the Schlieren image.

In this figure of the drawings (Fig. 1) the comparison beam 2c is treated or "manipulated" in the same optical manner as the test beam 2b. A small concave "off axis" or out of center parabolic reflector 20 reflects and converges the comparison beam through a focal point 20a onto the reflecting surface of a large concave out of center or off axis parabolic front surfaced mirror or reflector 21 having its focal point at 20a slightly at one side of the focal point of the small parabolic mirror 20. The large reflector 21 reflects the enlarged comparison beam 2g' in parallel relation to the test beam 2f until it strikes the mirror front surface of the large off axis or out of center concave parabolic reflector 22 which reflects and converges the beam through a point 22a adjacent its focal point, and the expanding portion of the beam strikes the smaller concave reflector 23 having its optical axis slightly offset relative to the optical axis of the mirror 22, as shown in the drawings or also used out of center. The comparison beam 2g' is thus reduced to its initial area again and is reflected parallel to the beam 2g' to the small full mirror or plate 24 which reflects the beam 2c to a second full flat inclined mirror 25 which reflects the comparison beam 2c on the original axis of the initial part of the comparison beam, to the inclined flat inclined plate full mirror 5 which reflects the comparison beam through the compensating plates 29, 29 to the partially transparent reflecting surface of the splitter plates 6 where the beam 2c is reflected to recombine with the test beam 2b to form the interference beam 2d.

While the light inlet and outlet paths are what is known as unsymmetrical or Z shaped the interferometer shown in Fig. 1 the arrangement is otherwise symmetrical since both the test beam 2b and the comparison beam 2c are enlarged to similar diameters at identical portions in their lengths and they are likewise reflected over similar light paths along similar axes, and the light paths are identical in length. Since the test beam and the comparison beam are treated, or "manipulated," identically between the light source 1 and the image receiving screen 8, it is possible to obtain interference (and Schlieren) images of the test medium when a larger model 26 is placed therein, by utilizing a basic interferometer system in which substantially all reflecting optical parts of the four basic reflector plates (2 beam splitter partial reflector plates and the two full mirror plates) are small in size, considerably smaller than the cross sectional field diameter of the test medium which is to be traversed by the test beam. Since small beam splitter plates and reflector plates of high optical quality can be manufactured and finished much quicker and much more economical than plates having large areas, the improved interferometer can be made at less expense. Also the small size makes mounting of the essential four plates (3, 4, 5 and 6) much easier and more rigid when small plates are used instead of all full large size plates. Also an interferometer for covering a prescribed large size area or test medium can be made much smaller and more conveniently by using small, more conveniently obtained, full and partially transparent reflector plates for the four basic reflectors of the system than where all of the reflector plates are the same size as the beam where it traverses a test medium of large size.

While parabolic (and spherical) reflectors of comparatively large sizes can be obtained with high quality concave front reflecting surfaces, these reflecting surfaces can also be brought to a higher state of optical perfection by slight localized deformations in the surface area thereof.

The concave reflectors shown in all of the figures of the drawings, also the optically flat full or plane mirrors and partially transparent beam splitting plates will be mounted rigidly relative to each other in the well known conventional manner. Also provision will be made for microadjustments of the reflectors, both pivotal and bodily displacement adjusting means being utilized where necessary. Since these latter adjusting means are conventional and well known in the interferometer art, illustration thereof is omitted from the drawings.

The large concave reflectors for producing the large test beam 2a (or the enlarged light beams shown in the other figures of the drawings) each comprise a rigid supporting frame 21x having the periphery or edge of the reflector securely mounted therein. The back of the frame 21x is formed with a plurality of threaded openings through which fine thread microadjusting screws or jacks 27 are mounted. The ends of the screws 27 are preferably universally secured to the rear surfaces of the concave mirrors, and some type of slow motion adjusting means is provided for rotatably adjusting the screws. These are shown in the drawing diametrically as the enlarged manipulating heads. With the interferometer in operation the screws 27 may be carefully adjusted so as to adjust localized areas of the concave reflecting surface by a controlled deformation thereof to bring the reflecting surfaces of very large concave reflectors (such as 15, 16, 21 and 22 in Fig. 1) to a state of optical perfection which can not be equalled by grinding and polishing alone.

Fig. 2 illustrates a modified interferometer incorporating a symmetrical arrangement, utilizing lenses instead of the out of center small parabolic mirrors 14, 17, 20, and 24 shown in Fig. 1. Light from the light source 28 passes through the light aperture or slit 29 and is focused by the lens element 30 on a very small partially coated flat mirror or beam plate splitter 31 which is located in the center of the enlarged portion 32a of the comparison beam 32. The transmitted portion of the initial beam passing through splitter plate 31, as indicated at 33 and is focused by the lens element 34 on a very small full mirror plate 35 and comprises the test or measuring beam.

The positive lens elements 30 and 34 converge the beams through points located at, or very close to, the reflecting surfaces of the small inclined reflectors 31 and 35, after which each of the beams is reflected to diverge with their axes in parallel side-by-side relation to each other. Large concave parabolic reflectors 37 and 38 have their focal points at the apexes of the light cones of the lens elements 30 and reflect the respective comparison and test beams 32 and 36 to form enlarged collimated comparison and test light beam portions indicated at 32a and 36a.

The enlarged portion 36a of the test beam traverses a test medium at 39 and is reflected by a second large concave mirror 40, converging the beam onto a second very small partially transparent plane mirror 41 inclined across the path of the beam for reflecting the converging beam 36b laterally through a lens element 42 and onto an image viewing screen 43.

If a Schlieren image is to be produced a second slightly larger partially transparent reflector or beam splitter plate 44 is inclined across the converging test beam portion 36b adjacent the partially transparent reflector plate 41, producing a Schlieren light beam 45 which passes through a positive lens element 46, forming a Schlieren image 54 on the screen 43. A Schlieren knife edge 47 engages the Schlieren beam at the converging point its smallest point 48 in the conventional manner, producing the Schlieren image 54 of the test medium 39 on the screen 43.

The large comparison (collimated) beam 32a is reflected by a third large concave parabolic mirror 49 in a converging direction 32b onto the very small full mirror plate 50 located at the center of the comparison beam 32a and at the converging point of the beam 32b and focal point of the mirror 49. The small mirror 50 reflects the converging comparison beam 32b out of the axis of the enlarged portion of the comparison beam 32a and through a positive lens element 51 which converges the comparison beam through the partially transparent beam splitting reflector plate 41 where it combines with the test beam that is reflected by the plate 41, to form the interference beam 52 producing an interference image at 53 in side-by-side relation to the Schlieren image at 54. A compensator plate 55 is inserted in the converging comparison beam 32b adjacent to the very small full mirror 50, compensating for angle conditions and optical path length due to the passage of the test beam through the Schlieren partial mirror or beam splitter plate 44. If wind tunnel windows are used these will also be compensated for by similar glass plates interposed in the comparison beam preferably in the smaller part thereof.

The full reflector plates 35 and 50 and the partially transparent beam splitter plates 31 and 41 can be made very small and can be finished so that their light reflecting surfaces will have the satisfactory optical flatness without great difficulty because of their small size. These may be supported in any conventional way, by a rigid spider, or on axially disposed small rods which are in turn supported by transparent optical flat plates of good optical quality. The lenses of 34 and 51 are also small size and can be obtained without great difficulty, but they also must be of the highest optical quality and workmanship. The four large concave mirrors 37, 38, 49 and 40 which produce the enlarged collimated portions of the test and comparison beams 32a and 36a are front surfaced reflectors, and therefore only the front concave or parabolic surface is of prime optical importance and they may be made of less expensive glass such as "Pyrex."

As before mentioned, these large concave reflectors can be obtained (with considerable difficulty and expense), with fairly high optical quality reflecting surfaces and the "almost" correct contour of these large concave reflecting surfaces can also be improved by utilizing the same method set forth in connection with Fig. 1, that of mounting them with their peripheries secured in annular frames 21x and providing the threaded micro-adjusting screws 27, which may be adjusted to locally deform the reflecting surfaces to the highest degree of perfection so necessary in interferometers. The small flat inclined reflectors 31, 35, 50, and 41 (and 44) of the basic interferometer system will form a small central shadow in the enlarged collimated beams 32a and 36a, but since this shadow will usually lie within the confines of the perimeters of the model being tested in the test medium 39 the shadow produced will ordinarily not be objectionable. A further advantage in this form of the invention is the provision of a symmetrical light inlet and outlet arrangement for all of the light beams which improves the optical arrangement over that shown in Fig. 1.

In Fig. 3 only that portion of the test or measuring beam which traverses the test medium is enlarged. The comparison beam is not enlarged, but it is otherwise "manipulated" so as to have the identical optical length and number of reflections as the test beam, and the light inlet and exit are symmetrical. This form of the invention requires only two large front surface parabolic reflectors instead of the four shown in Figs. 1 and 2 and provisions are also made for deforming the large reflectors in the same manner as shown in the previously described arrangements.

Light from a light source 60 passes through an aperture or slit in an aperture plate 60', and is collimated by a lens 60" to form the initial light beam 61. A partially transparent flat mirror is inclined across the beam 61 and forms a beam splitting plate 63 dividing the initial beam 61 into a test or measuring beam 62 passing through the plate 61, and a comparison beam 63 reflected by the plate 61.

A small concave parabolic front surfaced out of center mirror 64 is disposed transversely across the test beam 62 and a small flat full mirror 65 is inclined across the reflected portion 62a of the beam 62. It should be noted at this point that the mirror 65 is inclined across converging test beam 62a at substantially the focal point of the concave parabolic reflector 64, also that the collimated test beam 62 at this point is slightly less than one-half the diameter of the reflector 64 and it strikes the reflector 64 at one side of its optical axis so that only about one-fourth of the concave reflector 64 is utilized to reflect the beam 62a through its focal point. This arrangement disposes the focal point of the reflector 64 and location of the small mirror 65 at one side of the test beam 62. As far as the unused balance of the concave reflector 64 is concerned it could be removed and utilized for other purposes, for instance, the concave reflector could be split and the other half used as the second concave reflector 75 in the system for collimating the test beam after it has traversed the test medium and has been reflected by the large concave mirror 72 (referred to later).

The converging test beam 62a passes through the focal point of the concave spherical mirror 64 and is reflected transversely by the small optically, flat, inclined full mirror 65 to a very large concave parabolic front surfaced full mirror or reflector 66 located in the diverging light cone 67 of the test beam portion. The focal point of the large front surfaced parabolic mirror 66 is located coincident with the focal point of the small concave reflector 64 so that the enlarged portion of the test beam is collimated as indicated at 68 with its axis passing through the center of the small reflector 65. A test medium 69 is disposed in the enlarged collimated test beam 68, in a test chamber such as a wind tunnel having large transparent windows 70, 71 of high optical flatness and quality. The windows 70 are spaced to receive therebetween a model to be tested, as indicated diagrammatically by the reference numeral 71. The test beam 68, after traversing the test medium 71, strikes a second large concave front surfaced parabolic mirror 72, preferably similar in size, quality and curvature to the other large reflector 66.

The second large concave reflector 72 converges the test beam, as indicated at 73, through its focal point 74 to form a diverging beam 73'. A second very small full mirror plate 76 is inclined across the converging beam 73 (or the diverging beam 73') at or close to the focal point 74. A second small concave parabolic front surfaced full mirror 75 is disposed transversely across the axis of the diverging beam 73' with its focal point located at the focal point 74. The parabolic mirror 75 is similar to the mirror 64, having a diameter slightly in excess of twice the diameter of the reduced test beam 77 which is reflected by it, permitting the small full reflector plate 76 to be placed at one side of the reduced test beam 77. The mirrors 64 and 75 have their axes disposed transversely to the coincident optical axes of the two large concave reflectors 66 and 72 which disposes the initial small and subsequently reduced portions 62 and 77 of the test beam to extend in parallel relation to each other. A small plane mirror 78 is inclined across the test beam 77, just outside of the enlarged collimated portion 68 thereof. The mirror 78 reflects the test beam portion 77 parallel to the axis of the enlarged portion 68 as shown. This reflected portion of the beam 77 being indicated at 79 strikes the partially transparent reflecting surface of a second plane mirror or beam splitting plate 80, reflecting a portion of the beam transversely through a lens 81 and produces a Schlieren image on a screen or image receiving surface 82 when a Schlieren knife edge 83 is disposed to engage the side Schlieren beam at the focal point of the lens 81 and the light aperture in front of the light source 60 is a small elongated rectangular slit with its longitudinal axis optically parallel to Schlieren knife edge 83. The portion of the test beam 79 which passes through the beam splitter plate 80 is indicated at 85 and it strikes the partially transparent reflecting surface of a beam splitter plate 86 which reflects a portion of the beam 85 transversely in combined relation with the comparison beam 63 which passes through the plate. It should be noted that the comparison beam 63 is not enlarged, but in order to equalize the length of the comparison beam 62 relative to the precise length of the test beam three full plane mirrors of small size are employed, indicated at 88, 89 and 90, disposed as shown, in the path of the comparison beam 63. The two mirrors 88 and 89 reflect the comparison beam 63 in a zig-zag path 63' to the mirror 90 which reflects the beam through the beam splitter plate 86 where it combines with the reflected portion 85 test beam to form the interference beam 91. A positive lens 92 disposed in the beam 91 produces a picture image of the interference phenomena on the image receiving screen 82 in side-by-side relation to the Schlieren image formed on the screen.

In order to compensate for the passage of the enlarged portion 68 of the test beam through the windows 70, 70 of the test chamber 69 small flat compensator plates having similar optical qualities and thickness are interposed in the test beam as indicated at 92, also a small transparent plate 93 positioned in the comparison beam compensates for the beam splitter (Schlieren) plate 80.

The concave reflecting surfaces of the long parabolic mirrors 62 and 72 may be further corrected by the adjustment of the jack screws 27 in the supporting frame 21x, in the manner described in connection with Figs. 1 and 2, providing the desired optical reflecting quality in the concave reflecting surfaces.

Figure 4 illustrated a slightly modified arrangement of the construction shown in Fig. 3, in which lens members 95 and 96 are substituted in the measuring beam 62d for the small concave spherical reflectors 64 and 75 of Fig. 3. The comparison beam 63d is reflected back and forth in parallel side-by-side relation by four small full mirrors 97, 98, 99 and 100, being passed through the two plano-convex lenses 101 and 102 and a convex lens 103 to manipulate the comparison beam 63d in the same optical manner as the test beam 62d throughout its path to the point where it combines with the comparison beam to form the interference beam 91d. Since the other elements shown are similar to those shown in Fig. 3 the same reference characters are applied with the exponent "d" added thereto.

Fig. 5 is a further modification of the arrangement shown in Figs. 3 and 4. The measuring or test beam 110 is arranged in the same manner as shown in Fig. 4. The comparison beam 111 in the arrangement shown in Fig. 5 is optically similar to the measuring beam but the dimensions of the parts are different but fit into a small basic interferometer system. Light from a light source 105 passes through a conventional light aperture plate or slit 106 and a lens 107 having its focal point at the light source or the slit produces an initial beam 108 of collimated light which is split by a partially transparent beam splitting mirror 109, dividing the beam 108 into a test or measuring beam 110, passing through the splitter plate 109 and a comparison beam 111 reflected by the plate 109, the light in both beams 110 and 111 being collimated.

The measuring or test beam 110 is converged through the focal point of a lens 112, through which the beam passes, onto a small flat full mirror 113 located similarly with respect to the small mirror 65d and lens 95 in Fig. 4.

The comparison beam 111 is reflected transversely by a small full mirror plate 114, passes through a lens element 115 which focuses the beam onto the reflecting surface of a very small full plane mirror 116 mounted on a rod 117 which is carried by a transparent glass compensator plate 118, reflecting the converging comparison beam 119 through the focal point of the lens 115 to a small concave (spherical) front surfaced reflector 120 having its focal point at the focal point of the lens 115, and being rigidly supported substantially in the extended plane of the large concave reflector 72e forming a part of the optics for producing the enlarged portion 68e of the measuring beam which traverses the test medium 69e located between the windows 70e, –70e containing a model which is diagrammatically illustrated at 71e. The optical arrangement of the measuring beam 110, after it passes through the lens 112 is identical to the optical of the measuring beam 62d shown in Fig. 4, and therefore the same reference numerals will be used for similar parts except the exponents will be changed from "d" to "e." It is thought that a detailed description of these identical optical elements is therefore unnecessary. The diverging portion 121 of the comparison beam 111 is again collimated as indicated at 122, and reflected by the concave parabolic reflector 123, in parallel relation to the enlarged portion 68e of the measuring or test beam 110, to the concave parabolic reflecting surface of a second small concave full mirror 123 which reflects the beam 122 through the focal point 124 of the second parabolic mirror 123. A very small flat full mirror 125 is inclined across the converging beam portion 126, being supported at the concentric optical axes of the large concave reflectors 72e and 66e by a rod 127 carried at the center of a transparent supporting compensator plate 128.

The mirrors 116 and 125 need only be of sufficient area to receive the contracted portions 119 and 126 respectively of the comparison beam 122 and therefore do not produce a shadow of objectionable size in the comparison beam or in the interference beam 91e. Likewise the two mirrors 113 and 76e in the measuring beam will produce very small shadows in that beam which will coincide with the shadows of the mirrors 125 and 116 in the recombined beams 91e forming the interference beam 91e. The mirror 125 reflects the diverging portion 129 of the comparison beam through a convex lens 130 having its focal point coincident with the focal point of the reflector 123, again collimating the comparison beam at 131. The axes of the portions of the beams 119 and 131 are parallel and perpendicular to the axes of the enlarged measuring beam 68e, also the lengths of the measuring and comparison beams are optically identical. The collimated portion 131 of the comparison beam strikes an inclined small full mirror plate 132 and is reflected thereby, as indicated at 133, to a second small full mirror plate 134, which reflects the beam, as indicated at 135, through the beam splitting plate 86e in combined relation with the portion 135 of the test or measuring beam that passes through the beam splitting plate 86e. This forms the interference beam 91e which passes through a lens 136e and is pictured on the screen 82e in side-by-side relation to the Schlieren image. The compensator plates 118 and 128, while much smaller than the windows 70e of the test chamber, are optically equivalent and therefore compensate for change in wave length of the large measuring beam 68e during its passage through the test chamber windows.

The transparent plate 93e likewise compensates for the beam splitting plate 80e, also the two lenses 96e and 112 in the measuring beam are compensated for by the two lenses 115 and 130 in the comparison beam portions 111 and 131.

Fig. 6 illustrates a further modification of the arrangements shown in Figs. 3–5. This arrangement is more simple than the previously described interferometers, also there is more light loss in the comparison beam which might be balanced by increasing the light reflecting quality of the first beam splitter plate in the basic interferometer system.

Light from a concentrated, preferably monochromatic light source 140, passing through a light aperture (or slit 141 when Schlieren pictures are desired), is collimated by a lens 142 to form the collimated beam 143 which strikes the first partially transparent mirror or beam splitter plate 144, the front surface reflecting coating thereof being predetermined so as to predetermine the ratio of light passing through the plate and forming the collimated test or measuring beam 145 relative to the amount of light reflected perpendicular to the axis of the beam 143 by the beam splitter plate, constituting the comparison beam 146.

Since the optical arrangement and location of the structure (reflectors, test chamber windows, lenses, etc.) for "manipulating" the test or measuring beam 145 is optically identical to that shown in Figs. 4 and 5, the same reference numerals will be used with the exponent "f" added (instead of "e.") It is thought that a detail description of these parts will not be necessary as it would be a duplication of the description of the optical structure for the reflection, expansion, and subsequent contraction and collimation of the test beam as set forth in the other previously referred to forms. Only the reflecting means and the arrangement of the path of the comparison beam is modified. The measuring beam 145 passes through a convex positive lens 147 similar to lens 95 in Fig. 4 or lens 112 in Fig. 5, which concentrates the beam through a focal point of the lens, the converging beam 62af being reflected by a very small full plane mirror 65f, expanding to form a very large test or measuring beam portion 68f, reflected by a large concave parabolic mirror 66f having its focal point coincident to the focal point of the positive lens 147, the large concave reflector 66f produces the very large collimated test or measuring beam 68f which is much larger than the initial beam 143 or the comparison beam 146, or any of the basic reflectors and beam splitter plates of the interferometer apparatus.

The enlarged beam 68f traverses a test medium 69f, passing through the windows 70f and is reflected by the second large concave parabolic reflector 72f, as indicated at 73f, through the focal point of the second large reflector 72f reflected by the contracted beam being a second very small full plane mirror 76f. The reflected beam 73f extending through the focal point then expands as indicated at 74f and passes through a positive lens 96f having its focal point coincident with the focal point of the large concave mirror 72f. The lens 96f forms the collimated beam 77f, which is now reduced in size to that of its initial portion 145.

The beam 77f is now reflected perpendicularly by the first full reflector plate or plane mirror 78f of the basic interferometer system, as indicated at 79f, and strikes the partially transparent reflecting surface of the beam splitter plate 80f, part of the beam 79f passing through the plate 80f, as indicated at 85f, and part of the beam 79f being reflected laterally as indicated at 84f to form the Schlieren beam which passes through the positive lens 81f, converges the Schlieren beam through the focal point of the lens 81f onto the image screen 82f. When a Schlieren knife edge 83f is slightly inserted into the beam 84f at the just mentioned focal point in optically parallel relation to the longitudinal edge of the light aperture slit 141 a Schlieren image of the relatively large size test medium 69f will be produced on the screen 82f.

The comparison beam 146 is "manipulated" optically in the same manner as the measuring beam 145 just described. A portion of the comparison beam 146 passes through the beam splitter plate 148 and a positive lens 149 to a convex (spherical) mirror 150 which is positioned at two focal length distances from the lens 149 which reflect the beam back through the lens 149 to the reflecting surface of the beam splitter plate on an identical optical path. The comparison beam is (partially) reflected again by the plate 148, as indicated at 151, and is reflected again by the small full mirrors 152, 153 and 154, as indicated at 155, 156 and 157 respectively. The portion 157 of the beam is parallel to the initial beam 143 (and to the test beam 145) and passes through the second basic beam splitter plate to 86f of the interferometer and combines with that portion 85f of the measuring beam which is reflected by the partially transparent reflecting surface of the beam splitter plate 86f. This produces the interference beam 91f which is projected on the screen 82f by the positive lens 136f, producing a juxtaposed image of the test medium 69f on the screen 82f at the side of the Schlieren image. This arrangement, as shown in Fig. 6 requires a greater number of high quality optical reflector plates, but these can all be of small size. Only two large elements are required, which are the concave front surfaced parabolic full mirrors 66f and 72f. These can be produced and "figured" to obtain high interferometer quality, but it is also contemplated to improve the quality of the reflecting surface by local deformation, mentioned in connection with the other forms. Careful small adjustments of the micro-adjustment jackscrews 27f permit localized adjustments of the contour of the large concave reflecting surfaces while the interferometer is in operation, permitting the reflecting surfaces to be improved to a state of perfection which is not possible by conventional grinding and polishing alone. The transparent plates 92f compensate for the wind tunnel windows 70f, and the plate 93f also in the comparison beam 157 is arranged to compensate for the Schlieren beam splitter plate 80f in the measuring beam 79f. Since the comparison beam 146 passes once through the beam splitter plate 148, this plate would probably compensate for the Schlieren beam splitter plate 80f in the measuring beam and the compensating plate 93f might not be required.

Since the illumination of the comparison beam will be reduced to about 25% it will be preferable to coat the first beam splitter plate 144 for about 80% reflection and 20% transmission in order to obtain contrasting interference fringes in the interference beam.

The idea of the invention can also be applied to other basic intereference systems. The examples shown and described above relate to the Mach-Zehnder basic system in which the measuring or test beam traverses the test medium only once.

It is noted that in normal cases of the aerodynamic measuring technique the method is usually preferred where the light passes the medium to be tested only once because the results of an evaluation are uncertain if not entirely falsified if the light passes the medium to be tested more than once. There are special cases beside when an especially high sensitivity of the optical method is necessary but the errors due to the double pass of the measuring light beam through the test medium are within allowable limits. Such conditions exist in modern wind tunnels and measuring chambers with extremely high Mach numbers, and high altitude conditions where density and density changes are so small that even the Shadow-graph and Schlieren methods can not be used with satisfactory results.

Referring to Fig. 7 an example of an improved interferometer involving the Michelson principle is illustrated. This modified form utilizes only two large reflecting elements, one is a large flat mirror and the other a concave front surfaced parabolic mirror. One large and small mirror combination is utilized twice, once for enlarging the measuring beam and the second time for reducing the measuring beam area after it has traversed the test medium to its original small size.

A concentrated light source, preferably monochromatic light is indicated at 160, having a light slit or aperture 161 permits a beam of light 162 to pass through a positive lens 163, producing the initial collimated light beam 164. A first partially transparent beam splitter plate 165 inclined across the beam 164 splits the same to form a test or measuring beam 166 reflected laterally by the splitter plate 165, and a comparison beam 167 passing through the plate.

The measuring beam 166 passes through a beam splitter plate 168 and is reflected by a concave parabolic mirror 169 having a diameter slightly greater than twice the diameter of the beam 166. The beam 166 strikes the reflector 169 at one side of its optical axis, and bringing the reflected beam 170 to a focal point located at one side of the beam 166. A very small optically flat full mirror 171 is inclined across the reflected converging beam 170 at, or very close to, the focal point of the parabolic reflector 169 and reflects the beam 166 toward a large concave precision parabolic reflector 172, having its focal point located coincident to the focal point of the small concave mirror 169. The expanding beam 173 is again collimated to form a very large measuring beam portion 174. A large optically flat front surfaced mirror plate 175 is disposed perpendicular to the axis of the enlarged collimated beam 174 and reflects the beam back again coincident to itself. The reflected beam strikes the large concave reflector 172, converging the beam through its focal point again, and the very small reflector 171 reflects the beam to the reflecting surface of the small concave mirror 169. The concave reflector 169 collimates and reflects the now reduced beam in coincident axial relation to the intial portion 166 of the beam. The reduced beam is now partially reflected laterally by the beam splitter plate 168 to form a Schlieren beam 176. Part of the beam 166 passes through the beam splitter plate 168 and through the beam splitter plate 165 where it combines with the comparison beam 167 to form the interference beam 177.

The comparison beams 167, after passing through the beam splitter plate 165 is reflected in an extended rectangular path 178, 179 by the two optically flat full mirrors 180 and 181 inclined across the path of the beam. A third small optically flat full mirror 182 is disposed perpendicularly across the path of the beam 179 reflecting the beam back to the mirrors 181 and 180, along its former optical axis. The returning portion of the collimated comparison beam 167 strikes the reflecting surface of the beam splitter plate 165 and a portion thereof is reflected thereby to combine with the beam 166, forming the interference beam 177.

Positive lens units 182 and 183 are positioned respectively in the Schlieren and interference beams as indicated for producing side-by-side Schlieren and interference images 185 and 186 on the screen. A Schlieren knife edge 187 is disposed at the first focal length distance to engage or slightly enter the side of the beam 176 in parallel relation "optically" to the side edge of the light slit 161.

A test medium is indicated at 188, located between side windows 189 of a test chamber or wind tunnel containing the model or object 190 (illustrated diagrammatically) to be tested. The test chamber is preferably disposed close to the large optical flat mirror 175 so that although the measuring beam traverses the test medium twice its travel distance between the test medium traverses is maintained at a minimum. A pair of small compensator plates 191 are inserted in the comparison beams 167 which compensate for the passage of the enlarged portion 174 of the measuring beam through the side windows 189 of the test chamber 188. The optical lengths of the measuring beam and the comparison beam, where the collimated beam 164 is initially split by the plate 165 to form the two beams 166 and 167 and the point where the same plate is utilized to recombine the two beams 166 and 167 to form the interference beam 177, are identical. All optical elements may be small, much smaller than the test medium or model 190 in the chamber 188, with the exception of the two front-surfaced mirrors 172 and 175 which must be as large as the enlarged collimated portion 174 of the measuring beam 166. The large mirrors 172 and 175 must possess high optical reflecting quality, which may be improved by local deformation as contemplated in Figures 1 to 6. Adjustment of the microjack screws 192 mounted in the frames 193 supporting the large reflectors 172 and 175 at their peripheries provide for localized fine adjustments of the reflecting surfaces while the interferometer is in operation. If desired the smaller concave parabolic reflector 169 may be similarly supported and provided with similar microjack 194 for increasing the optical reflecting quality of this reflector also.

Fig. 8 discloses an arrangement where the out of center parabolic mirror 169 in Fig. 7 is replaced by positive lenses. The optics and light paths of the comparison and test beams are slightly modified and simplified however.

Since most of the optical system shown in Fig. 8 is identical to that shown in Fig. 7 these parts are not described again in detail. The same reference numerals used in Fig. 7 will be applied to the similar parts with the exception that the exponent "g" is added.

Light from the light source 160g after being split by the partially transparent beam splitter plate 165g forms the measuring beam 166g and the comparison beam 167g. The measuring beam 166g passes through the beam splitter plate 168g and a positive lens 200, converging the measuring beam, as indicated at 201, through its focal point and the expanding beam is then reflected by the large concave parabolic reflector 172g, having its focal point coincident to the focal point of the lens element 200. At, or adjacent the focal point just mentioned a very small flat full mirror 202 is inclined across the converging beam 201 (or the diverging beam 173g) reflecting the measuring beam to the large mirror 172g which produces the large reflected collimated portion 174g of the measuring beam. The large flat full mirror 175g reflects the enlarged portion 174g of the measuring beam back to the mirror 172g and the beam is reduced again in the reverse manner of its enlargement, as explained in Figure 7. The measuring beam passes through the beam splitter plates 168g and 165g, and is recombined with the comparison beam to form the interference beam 177g. Lens 183g produces an interference image 186g on the screen 184g of the large test medium 188g located in the enlarged measuring beam portion 174g, adjacent the large flat full mirror 175g.

The comparison beam 167g is optically "manipulated" in a similar manner as the measuring beam 166g except that it is not enlarged. The small full flat mirrors 180g, 181g reflect the beam through a positive lens 203 which converges the comparison beam through its focal point onto a small concave, spherical mirror 204 located 2 focal lengths distance from focal point of the lens 203. This arrangement returns the comparison beam on itself to the beam splitter plate 165g where it is partially reflected to combine with that portion of the measuring beam passing through the beam splitter plate 165g, producing the interference beam 177g.

The Schlieren picture is produced as in Fig. 7. The returning small measuring beam, after its enlarged portion 174 has traversed the test medium, is split by the beam splitter plate 168g to produce the Schlieren beam 176g, the Schlieren beam being reflected by a small flat full mirror 176'g through a positive lens 182g located three focal lengths distance from the image screen 184g. A Schlieren knife 187g engages the Schlieren beam at the first focal length and produces a Schlieren image 185g of the test medium 188g on the screen 184g.

Fig. 9 discloses a further modified and simplified arrangement in which the measuring beam is also enlarged where it traverses the test medium and then again reduced to its normal size by the use of a single very large concave spherical mirror and a small parabolic mirror. The balance of the interferometer structure is composed of conventional small size elements which can be obtained fairly easy at a fairly reasonable cost. This arrangement will probably be limited in its use to special purposes since the rays in the measuring beam throughout the enlarged portion of the beam are not parallel but diverge to their maximum large area at the single large concave spherical mirror and then converge through the focal point of the large mirror again and are then expanded to the original size of the initial collimated beam. One of the special uses of the interferometer shown in Fig. 9, for instance, is in connection with ballistics for flying projectiles, with very small extension of the density field in the direction of the span longitudinal to the direction of enlarged portion of the measuring or test beam.

This arrangement as shown in Fig. 9 leads to a very important consequence for the measuring technique. Up to the present time the well known "Faucault knife edge method" and the "zone method of Hartman" has been employed for testing the quality of concave mirrors. Both methods produce critical satisfactory quantitative data but require a great deal of care and experience in using them to obtain satisfactory results. Interference measurements which show the desired quantitative results within the entire measuring area can be made only for small sizes by covering the surface to be measured by a known comparative surface of very high quality. Also for curved surfaces such an interference method can be used by covering the curved surface to be tested with a similar but known curved surface producing the interference phenomena in the layer therebetween.

In addition to the main purpose of the arrangement shown in Fig. 9 (and Figs. 10 and 11) the apparatus shown and described can also be utilized for the exact investigation of the surfaces of unusually large spherical mirrors by the interference method. All of the small optical parts can be made to possess extremely high quality, and known to be almost perfect. Then the resulting interference figure produced by the instrument represents directly the natural and true surface figure of the big spherical concave mirror and can be observed on the image recording screen and since the large mirror and support are provided with localized micro adjustable deforming jack means the big mirror can be further corrected, step by step, up to the desired accuracy.

A concentrated monochromatic light source 210 projects light through the light aperture or a rectangular slit opening 211 and the positive lens element 212 collimates the light to form the initial beam 213. The intial beam 213 strikes the partially transparent mirror or beam splitter plate 214, dividing the beam into the collimated measuring beam 215 and the collimated comparison beam 216. The measuring beam 215 passes through the splitter plate 214 (and the second beam splitter plate 223 for later dividing the measuring beam after it has traversed the "test medium," to produce the Schlieren beam) and strikes the small parabolic concave mirror 217 at one side of its optical axis. The concave mirror 217 is provided with localized deforming jack screws 218 mounted in threaded openings in the back of the mirror supporting frame 219 whereby the optical quality of this mirror can be improved by their micro-adjustment.

The measuring beam 215 is reflected and contracted through the focal point of the small concave mirror 217 and is reflected by the plane mirror 221 to expand the beam toward a very large spherical concave reflector 220 having its focal point adjacent to but located between the small concave mirror 217 and its focal point. The very small flat full mirror 221 is inclined across the converging reflected beam from the mirror 217 on the axis thereof, and at one side of the collimated portion 215 of the measuring beam, so as to reflect the converging beam 222 to the surface of the large mirror 220, and to reflect the returning reflected beam from the large mirror 220 to the small concave mirror 217 where it is again collimated in coincident axial relation with the original outgoing comparison beam. The returning collimated beam is split by the beam splitter plate 223 to provide a Schlieren beam 224 which is reflected by the small full mirror plate 225 through a positive lens element 226 located preferably at three focal lengths distance from the interference and Schlieren image receiving screen 227, the conventional Schlieren knife edge 228 being disposed in engagement with the side or edge of the beam at the focal point 229 in optically parallel relation to the long edge of the elongated rectangular light slit or aperture 11.

A Schlieren image 230 is projected onto the screen 227 when a test medium located immediately in front of the large reflector 220 is disturbed, such as, by the passage of a flying projectile or missile, diagrammatically illustrated at 231, through the test medium.

The enlarged portion of the comparison beam is indicated at 232. The remaining portion of the returning measuring beam which passes through the beam splitter plate 223 also passes through the previously referred to partially transparent beam splitter plate 214 and combines with the returning comparison beam 216, reflected by the beam splitter plate 214, to form the interference beam 233.

The interference beam 233 passes through a lens element 234, similar to the lens element 226, producing interference image or picture 235 on the screen 227 in side-by-side relation to the Schlieren image or picture 230.

Referring back to the comparison beam 216, this beam is reflected by the two small full reflector plates or mirrors 236 and 237 in a rectangular path 238, 239 to the perpendicularly disposed small flat full mirror 240 and is reflected thereby on itself and, by the mirrors 237 and 238 to the partially transparent reflecting surface of the inclined beam splitter plate 214 which reflects the beam in coincident axial relation to the returning measuring beam to form the interference beam 233.

In the modified form shown in Fig. 10, the arrangement of the optical elements are substantially the same as the interferometer shown in Fig. 8 with the exception that the Schlieren beam producing means is omitted and the large flat full reflector 175g shown in Fig. 8 is modified by substituting a large partially transparent flat mirror 250 for the purpose of obtaining a "shadowgraph" image of the test model at rear of the mirror 250. The similar detail structure shown in Fig. 8 will not be described too specifically in the description of Fig. 10 and the reference numerals used in connection with Fig. 8 will also be employed in Fig. 10 to denote similar parts, except that the exponent will be changed to "i."

Light from the light source 160i is collimated at 164i by the lens 162i and is then split by the partially transparent flat beam splitter plate or mirror 165i, forming the collimated measuring beam 166i and the collimated comparison beam 167i. The measuring beam is reflected by the beam splitter plate 165i while the comparison beam 167i passes through this splitter plate. Since the measuring beam passes through the splitter plate 165i, a compensator plate 168i of similar thickness and quality is placed in the measuring beam.

The positive lens element 200i converges or contracts the measuring beam 166i through the focal point of the lens to expand the measuring beam, as indicated at 173i, where it strikes a large concave parabolic reflector 172i, having its focal point located coincident with the focal point of the lens element 200i. A very small flat full plane mirror 202i is inclined at 45° relative to the optical axis of the lens 200i and is located very close to, or coincident with, the coincident focal points of the large reflector 172i and lens 200i for reflecting the measuring beam transversely to a second large plane mirror 250 having a partially transparent front coated reflecting surface 251. A sensitized image receiving surface or screen 252 is provided at the rear of the plate 250 for receiving thereon a shadowgraph picture or image of the model or object 190i located in the test medium 188i. The enlarged collimated measuring beam portion is indicated at 174i and passes through the windows 189i and is partially reflected back again along its axis by the large partially transparent reflector plate 250 to the large parabolic mirror 172i, and is again reflected, by the mirror 172i, as a converging beam, through the focal point at the large reflector and is then reflected by the reflector 202i through the lens 200i, part of the beam passing through the splitter plate 165i is combined with the returning reflected comparison beam 167i to form the interference beam 177i.

The comparison beam 167i passes through the small compensator plates 191i which compensate for the passage of the enlarged measuring beam 174i through the test chamber windows 189i. The small flat full mirrors 189i and 181i direct the comparison beam 167i, as indicated at 178i and 179i, in a rectangular path to the positive lens element 203i. The lens element 203i is located at two focal lengths distance from the small spherical mirror 204i which reflects the comparison beam back on its former path through the lens 203i and by the mirrors 181i and 180i reflect the beam 179i to the beam splitter plate 165i where a portion of the returning comparison beam is reflected by the splitter plate 165i to combine with the returning measuring beam to form the interference beam 177i. The interference beam passes through the lens 183i which produces an interference image or picture 186i on the screen 184i.

The measuring and comparison beams 166i and 167i are optically similar and the measuring beam 166i is enlarged throughout the portion 174i thereof which traverses the test medium 188i and is again reduced to the original area. Only two large size optical quality reflectors are required in this form which are the large parabolic reflector 172i and the large partially transparent flat reflector 250. Of course the two large window plates 189i of the test chamber must be of very high quality optical glass with their sides ground to a high degree of flatness parallel to each other. Since the body of the concave mirror, and the body of the flat partially transparent mirror are not used in the interferometer apparatus for transmitting interference rays therethrough to produce interference fringes these parts may be made of the less expensive types of good glass, for instance, "Pyrex" glass. The reflecting surfaces of the mirrors 172i and 250 however must be of the highest optical quality and finish.

The quality of the parabolic reflecting surface of the concave mirror 172i can be further improved by localized slight deformations as indicated in connection with the other forms. The reflector 172i is mounted rigidly in the frame 193i and the micro-jack screws 192i are adjustable to slightly individually adjust the desired localized areas of the reflector while the interferometer is in operation so that results can be simultaneously observed on the screen 184i. The lens element 203i in the comparison beam compensates for the lens element 200i in the measuring beam 167i. The small spherical concave reflector 204 reflects the comparison beam back through its own path in the same manner that the large concave (parabolic) mirror 172 and small flat mirror 202i reflect the enlarged measuring beam back on its original path through the lens element 200i.

Since only a shadowgraph image is produced on the screen or sensitized surface 252, the partially transparent reflecting surface 250 can be made to reflect the major portion of the light, permitting only a minor portion to pass through which is sufficient to obtain the shadowgraph image.

The partially transparent reflecting surface coatings of the mirrors 165i and 250 are made such that the amount of transmitted light in the comparison and measuring beams is substantially balanced in order to obtain good contrasting interference fringes. This however is conventional in interferometers.

In Fig. 11 the optical arrangement is quite similar to Fig. 7 except the results are obtained by the use of only one large manufactured parabolic mirror and a liquid reflecting surface of large area and projecting the enlarged collimated measuring beam vertically downward to the reflecting surface 260 of a liquid 261 contained in a receptacle or pan 262 having an area somewhat more extensive than the area of the enlarged beam 174k so that the edge portion of the liquid reflecting surface will extend beyond the rim or perimeter of the light beam 174k.

Since the reflecting surface 260 of the liquid 261 is inherently level, horizontal, and optically flat (and, for a maximum diameter of the large beam 174k such as 4 to 6 feet any curvature caused by the earth's surface curvature can be ignored). This curvature is however known and therefore can be compensated for if necessary, but it is ordinarily so small that it can be neglected.

The inherently flat liquid reflecting surface 260 again reflects the enlarged collimated measuring beam vertically to the concave, parabolic reflector 172k and the beam is reflected back on its original path 173k, 170k, 166k, respectively by the large parabolic mirror 172k and the small optical elements 171k and 169k. The measuring beam then strikes the beam splitter plate 165k, part of the beam passing through the plate 165k and through the positive lens 183k is combined with the returning comparison beam reflected by the plate to form the interference beam 177k and the lens 183k produces an interference picture 186k on the image receiving screen 184k. Since the comparison beam originally passed through the partially transparent beam splitter plate 165k a similar transparent compensator plate 165k' is interposed in the measuring beam. The effective optical length and "manipulation" of the measuring and comparison beams 166k and 167k are identical except that the comparison beam is not enlarged. The flat small mirrors 180k, 181k and 182k reflect the comparison beam in the rectangular path 178k, 179k to provide the extended linear path for the comparison beam.

In the other forms some mechanical means is preferably provided for equalizing the optical length of the measuring and comparison beams, such as the bodily micro-adjustment of one or more of the small reflectors in the comparison beam.

In this figure the optical lengths of the two beams 166k and 167k may be equalized by simply varying the quantities of the reflecting liquid 260 in the receptacle 262.

Since the reflecting surface of a liquid, such as the liquid 261 contained in receptacle 262 is known to be inherently flat the apparatus can also be utilized as test or measuring means for the large parabolic mirror 172k. If it is desired to determine the optical quality of the large parabolic mirror 172k, the jack screws 192k which are mounted in the frame 193k carrying this mirror may be adjusted until the desired minimum number of interference fringes show on the screen 184k.

Once the reflector 172k has been adjusted to produce the desired minimum number of fringes on the screen 184k a flat mirror such as shown in Fig. 7 may be substituted for the reflecting liquid, and the contour of this mirror can then also be adjusted to produce the minimum number of fringes on the screen 184k, or the surface of this flat mirror becomes improved by polishing until the desired surface quality is obtained.

In any event, if a test medium is placed in the enlarged portion 174k of the measuring beam, in a manner similar to the positioning of the test medium 183 in the measuring beam 174 in Fig. 7, the interference fringes can be used for increasing the density and density changes within the medium to be tested.

What I claim is:

1. In an optical four plate interferometer arrangement for the investigation of the light density fields of a test medium by the interference method including monochromatic light and lens means for producing an initial beam of monochromatic light, reflector means for splitting said light beam to form measuring and comparison beams of monochromatic light respectively traversing separate light paths of equal optical length, said measuring beam being disposed to traverse a test medium when interposed therein, reflector means for recombining said measuring and comparison partial light beams after the passage thereof through said separate light paths, to form an interference beam; image receiving screen means in the path of the interference beam for receiving an interference image in the interference beam when a test medium is interposed in the said measuring beam, including means in the measuring partial light beam which traverses the test medium, located between position of the test medium and the beam splitting means, to expand the last mentioned beam and form an expanded test medium traversing portion, and means disposed in the expanded portion of the measuring beam between the position of the test medium therein and the recombining means, for contracting the measuring beam before it reaches the recombining means and after it traverses the test medium, whereby the portion of the partial beam traversing the test medium is expanded to traverse a test medium therein of larger size than the initial beam and the recombined interference beam, and is then reduced to substantially its former size before it is combined with the comparison partial light beam to form the interference beam.

2. An improved interferometer apparatus for investigating the density fields of a test medium comprising means for producing an initial beam of monochromatic light, beam splitting plate means inclined across said initial beam for splitting the initial beam into measuring and comparison partial beams of light respectively traversing separate light paths of equal optical lengths, said measuring partial beam being disposed to traverse a test medium interposed therein including means for expanding the test medium traversing measured light beam between the beam splitting plate means and the test medium receiving portion of the beam and contracting the expanded portion of the test medium measuring light beam after it has traversed the test medium receiving position and means disposed in both of the partial light beams at equal optical distances from the beam splitting means following the contraction aforesaid of the test medium traversing portion of the partial beam, for recombining the two partial light beams at equal optical distances along the axes of the partial beams from the beam splitting plate means to form an interference beam, lens means in the interference beam having an image forming plane; and an interference image receiving screen disposed in the image forming plane to receive thereon a picture image of the light wave interference in the interference beam when the test medium is interposed in the said expanded position of the said measuring partial light beams.

3. An optical arrangement having a basic interferometer system of relatively small size light reflecting elements for investigating a much larger density field of a test medium by the interference method including means for producing a beam of collimated light, partially transparent flat mirror means inclined across the collimated beam for splitting the beam into a measuring beam of collimated light and a comparison beam of collimated light traversing separate paths of equal linear dimensions, and partially transparent flat mirror means in the aforesaid partial beams for recombining the measuring and comparison beams to produce an interference beam, the measuring beam being adapted to traverse a test medium having a cross sectional area greater than the cross sectional area of the first mentioned collimated beam or the interference beam, and means in the measuring beam for expanding the measuring beam to a cross sectional area sufficient to traverse the test medium and then contracting the measuring beam to its initial size after the same has traversed the test medium.

4. In an interferometer apparatus for the investigation of density fields of a relatively large test medium, a basic interferometer arrangement comprising means for producing a beam of collimated light, a partially transparent reflector plate inclined across the collimated beam for splitting the beam to form a collimated measuring beam adapted to traverse a test medium and a collimated comparison beam traversing separate spaced diverging light paths of equal linear dimensions, full mirror means inclined across the collimated measuring and comparison beams for reflecting the same across each other, a second partially transparent reflector plate inclined across the measuring and comparison beams for recombining the last mentioned beams to form an interference beam, forming a basic interferometer system, optical means disposed in the measuring beam for expanding the measuring beams and collimating the expanded portion prior to its traverse of a test medium interposed therein, and means for contracting the measuring beam to its original size subsequent to the passage thereof through the test medium.

5. Apparatus as claimed in claim 4 in which the measuring beam expanding and the contracting means each include a small concave mirror, and a large concave mirror having a diameter at least equal to the diameter of the expanded portion of the measuring beam, said concave mirrors for expanding the measuring beam having coincident focal points disposed on the optical axis of the measuring beam at one side of the test medium receiving portion of the measuring beam and the said concave mirror for contracting the measuring beam having coincident focal points located on the optical axis of the measuring beam at the opposite side of the test portion of the measuring beam.

6. An optical arrangement for the investigation of density fields of a test medium by the interference method including means for producing a beam of collimated light, a partially transparent beam splitter plate inclined across the collimated light beam for splitting the collimated beam into two partial beams of collimated light respectively traversing separate paths, means for recombining the partial light beams after the passage thereof through separate light paths of equal linear dimension to form an interference beam, image forming means in the interference beam for producing an interference image, a screen for receiving said interference image, means in both of said partial light beams for expanding and subsequently contracting both of said beams to increase the coverage area of said partial beams, and the expanded portion of one of said partial beams having a size greater than the first mentioned collimated light beam or the interference beam for traversing a test medium therein having a greater cross-sectional area than the first mentioned collimated beam.

7. In an interferometer, means for producing a collimated light beam, means for splitting the beam to form two collimated partial light beams respectively traversing separate light paths, one of which separate paths is arranged to traverse a test medium having a greater cross sectional area than the cross sectional area of the said collimated light beam, and spaced concave reflector means positioned at opposite sides of the test medium and located in the path of the partial light beam which traverses the test medium for expanding the last mentioned partial light beam before it traverses the test medium therein to cover the area occupied by the test medium and then contracting the last mentioned partial light beam to its former size, after the same has traversed the test medium.

8. An optical arrangement for the investigation of the light density fields of a test medium by the light interference method including a light source and means for producing an initial collimated beam of light, partially transparent beam splitter plate means inclined across the initial collimated beam for dividing the beam into a collimated measuring beam, adapted to traverse a test medium therein having a cross sectional area greatly in excess of the cross sectional area of the initial collimated beam, and a collimated comparison beam, said measuring and comparison beams traversing separate light paths of equal linear dimensions, a full mirror inclined across the measuring beam path for reflecting the same in parallel spaced relation to the comparison beam, two opposing spaced pairs of parabolic mirrors inclined across each of the measuring and comparison beams having their optical axes offset for reflecting the measuring and comparison beams in a zig-zag optical light entrance and exit path, two of the parabolic mirrors, one mirror of each pair being of larger area and having relatively longer focal length than the other parabolic mirror of the pair, and facing each other with their optical axes disposed in offset parallel relation, whereby each of the measuring and comparison beams is expanded by the first smaller parabolic mirror of the two pairs in the respective beams, collimated by the first larger parabolic mirrors of the two pairs, then contracted by the second larger parabolic mirror of the two pairs and collimated again by the second smaller parabolic mirror in the two pairs and reflected thereby in spaced parallel relation to each other and to the initial collimated light beams; full reflector plate means inclined across the contracted collimated portions of the measuring and comparison beams for reflecting the same across each other at equal linear optical distances from the first mentioned partially transparent beam splitter plate means; a second partially transparent beam splitter plate inclined equally across both of the contracted measuring and comparison beams at their crossing point for reflecting one of the beams in coincident axial relation to the other to form an interference beam; the expanded collimated portion of the measuring beam being adapted to receive a test medium therein between the two large parabolic mirrors in that beam, and spaced transparent parallel window plates positioned across the expanded measuring beam for receiving the test medium therebetween; compensating plates for the window plates disposed across the comparison beam in the unexpanded portion thereof, lens means in the interference beam having an image forming plane for producing an image of the light wave interference in the interference beam; and an image receiving screen located in the image forming plane for receiving the interference image in the interference beam.

9. Apparatus as claimed in claim 8, including Schlieren image producing means comprising a partially transparent beam splitter plate inclined across the contracted measuring beam between the last of the two pairs of parabolic mirrors in that beam and the second mentioned partially transparent beam splitter plate, for splitting the contracted measuring beam to form a Schlieren beam extending in parallel side-by-side relation to the measuring beam; lens means in the Schlieren beam disposed at two focal lengths distance from the image screen, a Schlieren knife edge engaging the Schlieren beam at one focal length distance from the lens means; and an elongated rectangular light slit aperture disposed in front of the light source in optically parallel relation to the knife edge.

10. In an interferometer apparatus having a relatively small size four plate basic optical system, comprising a source of light, a light aperture therefor, means for collimating light passing through the aperture to produce an initial collimated light beam, a first basic partially transparent beam splitting mirror disposed at about 45° to said initial beam to divide the initial beam to form two collimated partial beams, one partial beam passing through the plate and traversing a test medium and constituting a measuring beam and the other partial beam being reflected by the plate perpendicular to the measuring beam to form a comparison beam, a small parabolic reflector positioned in the measuring beam with its optical axis perpendicular to the measuring beam for reflecting the measuring beam through its focal point, measuring beam expanding, collimating and contracting means located in said measuring beam, comprising a first large parabolic reflector having its optical axis perpendicular to the first small parabolic mirror optical axis at one side thereof and its focal point coincident to the small parabolic mirror focal point, a small full plane mirror inclined across the focal point and the optical axis of the first large parabolic reflector at 45° for reflecting the expanding measuring beam to the first large parabolic reflector, the expanded collimated portion of the measuring beam traversing the test medium positioned beyond the focal point of the first large parabolic mirror, a second large parabolic mirror facing the first large mirror with the axis thereof coincident to the first large parabolic mirror axis and its focal point located at the opposite side of the test medium, for contracting the measuring beam after the traversing thereof through the last mentioned focal point, a second small plane mirror inclined at 45° across the axis of the expanded collimated beam at the last mentioned focal point for reflecting the contracting measuring beam laterally out of the expanded collimated portion of the measuring beam, a second relatively small parabolic reflector disposed at the opposite side of the axis of the expanded collimated portion of the measuring beam with its focal point coincident with the focal point of the second large parabolic mirror and its optical axis perpendicular to the optical axis of the second large parabolic mirror, for collimating the contracted measuring beam to the size of the area of the initial collimated beam, a first basic full plane mirror inclined across the last mentioned contracted collimated beam at 45° for reflecting the same perpendicular relative to the axis of the initial beam, second basic full plane mirror means disposed in the comparison beam for reflecting the comparison beam across the last mentioned collimated portion of the measuring beam, a second basic partially transparent beam splitter plate inclined across the crossing portions of the measuring and comparison beams for recombining the last mentioned beams to form an interference beam, lens means in the interference beam having an image forming plane, and an image receiving screen disposed in said plane for receiving the image aforesaid thereon.

11. In an optical arrangement for the investigation of light density fields of a test medium by the light interference method, a concentrated light source, a light aperture therefor, positive lens means in front of the aperture for producing a collimated initial beam of light, a first beam splitter plane inclined across the initial light beam dividing the initial light beam into two partial light beams, one beam comprising a measuring beam adapted to traverse a test medium of larger size than the initial beam and the other partial beam having an equal optical length and traversing a separate path, a large parabolic reflector having covering power sufficient to include the test medium size and having a focal point, full mirror reflector means in the measuring beam for reflecting the measuring beam through the focal point to the large reflector, whereby the measuring beam is expanded and reflected by the large reflector to form an expanded collimated measuring beam adapted to traverse the test medium placed therein, a large flat plate reflector of similar area to that of the large parabolic reflector disposed across the expanded collimated beam in spaced relation to the parabolic reflector beyond the focal point thereof to receive the test medium between the said focal point and the large flat plate reflector, said large flat plate reflector reflecting the expanded collimated measuring beam back to the reflecting surface of the large parabolic reflector which in turn contracts the measuring beam by reflecting the same on its initial path back through partially transparent beam splitter plate to form a part of the interference beam, means for reflecting the comparison beam along an optically similar path of equal linear dimension comprising reflecting means inclined across the comparison beam for reflecting the same angularly, and a full mirror plate disposed perpendicular to the comparison beam at the same optical distance from the beam splitter plate as the distance therefrom of the large flat reflector plate, for reflecting the comparison beam back on itself to the said first mentioned beam splitter plate whereby said beam splitter plate reflects the comparison beam in coincident axial relation to the contracted portion of the measuring beam passing through the same splitter plate, to form the interference beam, and lens means in the interference beam having an image forming plane; and an image receiving screen in said image plane.

12. Apparatus as claimed in claim 11 including deforming means for the reflectors, comprising supporting means for the mirror, and localized micro-adjusting means carried by the supporting means, and connected to the mirrors in localized areas thereof, for adjusting said localized areas of the reflectors to improve the optical reflecting quality of the reflectors.

13. Apparatus as claimed in claim 11 in which the large flat reflector is partially transparent whereby a portion of the expanded collimated beam traversing the test medium passes through the partially transparent reflector to produce a shadow-graph image below the plate of a model in the test medium, and the balance of the expanded collimated beam is reflected by the partially transparent reflector and traverses the test medium a second time.

14. Apparatus as claimed in claim 11 in which the large flat reflector comprises a liquid having a light reflecting surface and a supporting container therefor, and the optical axis of the expanded collimated measuring beam is perpendicular.

15. In an interferometer device having an enlarged measuring beam, a relatively large concave parabolic mirror having its optical axis extending vertically downward with its focal point located below the mirror; a relatively small flat full mirror inclined across said optical axis adjacent said focal point at 45°, a small concave parabolic reflector having its optical axis disposed perpendicular to the optical axis of the large concave mirror and its focal point coincident to the large concave mirror focal point; a liquid receptacle disposed substantially horizontally below the large concave mirror, said receptacle having an annular liquid confining area, at least equal to the reflecting surface area of the large mirror, and disposed coextensively below the large mirror to receive a liquid, such as water, for instance, or any other kind of liquid therein having an inherently flat, horizontal liquid reflecting surface; means for producing a collimated light beam; partially transparent beam splitting mirror plate means inclined across the collimated light beam at 45° for dividing the light beam into a measuring collimated beam, projected horizontally to the reflecting surface of the small concave parabolic reflector, parallel to the axis thereof, and a comparison collimated beam traversing a separate light path; flat plane mirror means positioned in the comparison beam, perpendicularly thereto, at substantially the same effective linear distance from the beam splitting mirror plate as the effective linear distance from the reflecting surface of a reflecting liquid contained in the liquid receptacle to the beam splitting mirror plate; whereby both of said measuring and comparison beams are reflected back along their initial paths to the beam splitter plate to be recombined by said beam splitter plate to form an interference beam; lens means in the interference beam having an image forming plane; and a screen in the image forming plane for receiving the interference image, the effective linear distance of the measuring beam being adjustable by varying the level of the reflecting surface of the liquid to equalize the same relative to the effective linear distance of the comparison beam.

THEODOR W. ZOBEL.

References Cited in the file of this patent

UNITED STATES PATENTS

| Number | Name | Date |
|---|---|---|
| 1,915,204 | Scheibli et al. | June 20, 1937 |
| 2,256,855 | Zobel | Sept. 23, 1941 |
| 2,333,762 | Bertrand | Nov. 9, 1943 |
| 2,362,235 | Barnes | Nov. 7, 1944 |
| 2,541,437 | Prescott | Feb. 13, 1951 |